United States Patent
Watanabe et al.

(10) Patent No.: US 12,259,037 B2
(45) Date of Patent: Mar. 25, 2025

(54) LUBRICATION STRUCTURE OF POWER TRANSMISSION DEVICE

(71) Applicant: Honda Motor Co., Ltd., Tokyo (JP)

(72) Inventors: Moe Watanabe, Tokyo (JP); Yoshihito Kurizuka, Tokyo (JP); Kazuaki Watanabe, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 24 days.

(21) Appl. No.: 18/360,846

(22) Filed: Jul. 28, 2023

(65) Prior Publication Data
US 2024/0117875 A1 Apr. 11, 2024

(30) Foreign Application Priority Data
Oct. 6, 2022 (JP) .................. 2022-161460

(51) Int. Cl.
| F16H 57/04 | (2010.01) |
| F16H 57/02 | (2012.01) |
| F16H 63/34 | (2006.01) |
| B60K 6/20  | (2007.10) |

(52) U.S. Cl.
CPC ..... *F16H 57/0476* (2013.01); *F16H 57/0423* (2013.01); *F16H 57/0424* (2013.01); *F16H 57/045* (2013.01); *F16H 57/0457* (2013.01); *B60K 6/20* (2013.01); *B60Y 2200/92* (2013.01); *F16H 2057/02034* (2013.01); *F16H 2057/02043* (2013.01); *F16H 63/3416* (2013.01)

(58) Field of Classification Search
CPC ............... F16H 57/042; F16H 57/0421; F16H 57/0423; F16H 57/0424; F16H 57/045; F16H 57/0453; F16H 57/0457
See application file for complete search history.

(56) References Cited

U.S. PATENT DOCUMENTS

| 1,143,307 A | * | 6/1915 | La Verne Noyes .......................... F16H 57/0421 184/11.1 |
| 1,436,442 A | * | 11/1922 | Hodge ................ F16H 57/0427 475/159 |

(Continued)

FOREIGN PATENT DOCUMENTS

| JP | 2019131175 | | 8/2019 |
| JP | 6636877 | | 1/2020 |
| JP | 2021148245 A | * | 9/2021 |

OTHER PUBLICATIONS

"Office Action of Japan Counterpart Application", issued on Apr. 30, 2024, with English translation thereof, p. 1-p. 11.

*Primary Examiner* — Minh Truong
(74) *Attorney, Agent, or Firm* — JCIPRNET

(57) ABSTRACT

On a partition wall splitting the interior of a case into a gear chamber and a motor chamber, a through hole and a gutter member are provided. The through hole is provided for communication between the gear chamber and the motor chamber. The gutter member extends into the gear chamber below the through hole, and a tip end part thereof is provided above an oil storage part. Oil guided from the motor chamber into the gear chamber through the through hole of the partition wall is guided to the oil storage part through the gutter member, so that, for the oil storage part provided at a wall part not the partition wall of the case and not in contact with the partition wall, more oil can be stored.

20 Claims, 12 Drawing Sheets

(56) References Cited

U.S. PATENT DOCUMENTS

| | | | |
|---|---|---|---|
| 2007/0191168 A1* | 8/2007 | Corless | F16H 57/0483 74/606 R |
| 2013/0145879 A1* | 6/2013 | Nakamura | F16H 57/0441 74/467 |
| 2013/0283972 A1* | 10/2013 | Yamamoto | F16H 57/0486 903/902 |
| 2018/0066746 A1 | 3/2018 | Kim et al. | |
| 2020/0158228 A1* | 5/2020 | Ohkawa | B60K 17/344 |
| 2022/0282784 A1* | 9/2022 | Nakata | F16H 57/0424 |
| 2022/0316581 A1* | 10/2022 | Li | H02K 7/116 |
| 2024/0136891 A1* | 4/2024 | Tanaka | F16H 57/0423 |
| 2024/0229921 A1* | 7/2024 | Kosaka | F16H 57/0423 |
| 2024/0247713 A1* | 7/2024 | Kosaka | F16H 57/0424 |
| 2024/0313615 A1* | 9/2024 | Kosaka | F16H 57/0454 |
| 2024/0328502 A1* | 10/2024 | Satoda | H02K 9/19 |

* cited by examiner

Rear ←——→ Front

A-A

Front ⟵⟶ Rear

B-B

C-C

LUBRICATION STRUCTURE OF POWER TRANSMISSION DEVICE

CROSS-REFERENCE TO RELATED APPLICATION

This application claims the priority benefits of Japanese application no. 2022-161460, filed on Oct. 6, 2022. The entirety of the above-mentioned patent application is hereby incorporated by reference herein and made a part of this specification.

BACKGROUND

Technical Field

The invention relates to a lubrication structure of a power transmission device.

Description of Related Art

In a vehicle power transmission device transmitting the driving force of a driving source, such as an engine or an electric motor, to a wheel, rotation members, such as various gears, are accommodated in a case. However, as a lubrication method thereof, an oil bath method in which lubrication oil stored in the bottom part of the case is scooped up by a rotation member such as a final gear, and the respective parts are lubricated by the oil that is scooped up.

In such case, for example, in a power transmission device of a hybrid vehicle having a motor case accommodating an electric motor and a flywheel case accommodating a mechanism such as a gear, at the time of lubricating a bearing of a rotation shaft at a relatively high position in the case, conventionally, the oil scooped up from an oil pool of the case lower part by using a rotation member such as a final gear is received by a baffle plate, the oil is guided and stored to an oil catch tank provided on a wall part inside the case, and the oil is supplied to the bearing as the lubrication target via an oil passage provided in the case from the oil catch tank, thereby lubricating the bearing.

However, in the method, in the case where the rotation speed of the rotation member, such as the final gear, is low, there is a concern that the oil cannot be sufficiently scooped up, and the oil in the required amount for lubrication cannot be supplied. Conventionally, in order to be able to supply oil in the required amount for lubrication, it is necessary to use an expensive baffle plate with a complicated structure, which may hinder the cost reduction of the power transmission device or the vehicle as well as the simplification and weight reduction of the configuration.

PRIOR ART DOCUMENT(S)

Patent Document(s)

[Patent Document 1] Japanese Patent No. 6636877

SUMMARY

According to an aspect of the invention, a lubrication structure of a power transmission device is provided. The lubrication structure includes: a case, accommodating components of a power transmission device; a partition wall, splitting an interior of the case into a first chamber and a second chamber; and an oil storage part, storing oil in the first chamber. The oil storage part is provided at a wall part that is not the partition wall in the first chamber. The oil storage part is not in contact with the partition wall. The partition wall is provided with: a through hole for communication between the first chamber and the second chamber; and a gutter member which extends into the first chamber below the through hole and in which a tip end of the gutter member is disposed above the oil storage part.

DESCRIPTION OF THE EMBODIMENTS

Figure 1:
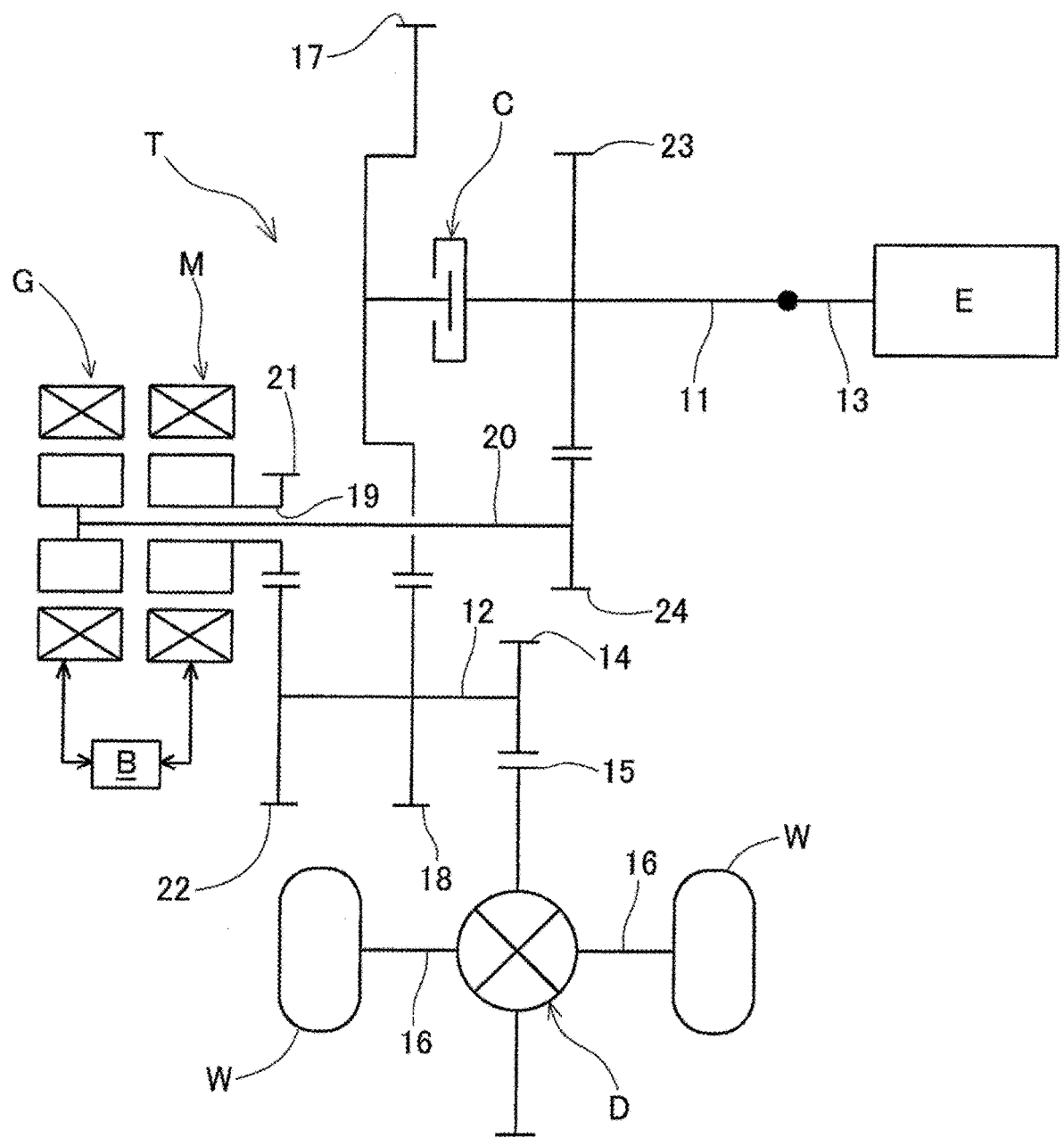
FIG. 1 is a skeleton view illustrating a basic configuration of a vehicle power transmission device including a lubrication structure according to an embodiment of the invention.

According to the invention, sufficient oil for lubricating a portion of a lubrication target can be supplied even in the case where the rotation speed of a rotation member, such as a final gear, is low and to provide a lubrication structure of a power transmission device capable of forming a lubrication system that is cheap and simple without using an expensive and complicated baffle plate. In addition, an objective is to, through the improvement of the lubrication structure of the power transmission device, reduce the size as well as the weight of the vehicle or the power transmission device, and improve the energy efficiency.

In order to achieve the objective, a lubrication structure of a power transmission device according to the invention includes: a case (2), accommodating components of a power transmission device (T); a partition wall (3), splitting an interior of the case (2) into a first chamber (4A) and a second chamber (4B); and an oil storage part (40), storing oil in the first chamber (4A). The oil storage part (40) is provided at a wall part that is not the partition wall (3) in the first chamber (4A). The oil storage part is not in contact with the partition wall (3). The partition wall (3) is provided with: a through hole (3a) for communication between the first chamber (4A) and the second chamber (4B); and a gutter member (50) which extends into the first chamber (4A) below the through hole (3a) and in which a tip end (50a) of the gutter member is disposed above the oil storage part (40).

According to the lubrication structure of the power transmission device according to the invention, the oil guided from the second chamber into the first chamber through the through hole of the partition wall is guided to the oil storage part along the gutter member. Therefore, for the oil storage part provided at a wall part not the partition wall of the case and not in contact with the partition wall, a greater amount of oil can be stored.

Also, in the lubrication structure, it may also be that a concave-shaped oil flow passage (51) is provided on an upper surface of the gutter member (50).

According to the configuration, by providing the concave-shaped oil flow passage on the upper surface of the gutter member, the oil can be efficiently guided to the oil storage part by using the gutter member.

In addition, in the lubrication structure, at least an upper surface of the gutter member (50) may be inclined downward from a partition wall (3) side toward a tip end part (50a) side.

According to the configuration, the oil can be more efficiently guided to the storage part (40) by using the inclination of the upper surface of the gutter member (50).

In addition, in the lubrication structure, it may also be that a tip end part (50a) of the gutter member (50) is located above the oil storage part (40) and not in contact with the oil storage part (40).

According to the configuration, with the tip end part of the gutter member located above the oil storage part 40 (at a separated position thereabove), the oil guided to the oil storage part by using the gutter member can be collected in the oil storage part without spilling.

In addition, in the lubrication structure, it may also be that, in the gutter member (50), from a partition wall (3) side to a tip end part (50a) side, a height dimension gradually decreases, and a width dimension gradually decreases whereas a component thickness dimension gradually decreases, so that a width dimension of the concave-shaped oil flow passage (51) gradually increases.

According to the configuration, in the gutter member, toward the tip end part, the overall width and the overall thickness decrease, and the thickness also decreases. In addition, the width of the oil passage of the concave part increases. In addition, since the groove width of the concave part increases toward the tip end part, the oil can be more effectively collected.

In addition, in the lubrication structure, it may also be that the gutter member (50) is below the through hole (3a) on the partition wall (3) and located behind a center of the through hole (3a) in a vehicle front-rear direction. In addition, it may also be that a cross-section of the gutter member (50), a thickness at a rear in a vehicle front-rear direction is greater than a thickness at a front. In addition, it may also be that the lubrication structure has, on a first chamber (4A) side of the through hole (3a), a holder part (33) connected with the partition wall (3) and having an end surface at an upper part of the gutter member (50).

In addition, in the lubrication structure, it may also be that oil passing through the through hole (3a) from the second chamber (4B) and flowing into the first chamber (4A) is received by the gutter member (50) and introduced into the oil storage part (40), the oil is stored in the oil storage part (40), and the oil storage part (40) has a lubrication oil passage (47) on a wall part of the case (2B) on which the oil storage part is provided and introduces the oil to a lubricated part (12a) in the first chamber (4A) via the lubrication oil passage (47).

In addition, in the lubrication structure, it may also be that at least one sidewall of the oil storage part (40) is formed by a wall part of the case (2B), and a bottom part of the oil storage part (40) is at a position higher than a bottom part (5a) of the first chamber (4A) and formed by a first rib (41) extending from the wall part of the case (2B), and at least one other sidewall includes a baffle plate (45) attached to the first rib (41). In addition, it may also be that the lubrication structure has a second rib (42) above the oil storage part (40) and higher than the gutter member (50), the second rib extending from a wall part of the case (2B). In addition, it may also be that the baffle plate (45) is attached to the first rib (41) and the second rib (42). In addition, it may also be that a portion of the baffle plate (45) opposite to the gutter member (50) is bent toward the partition wall (3).

In addition, in the lubrication structure, it may also be that oil is stored in a bottom part (5a) of the first chamber (4A), a rotation member (15) is provided in the first chamber (4A), a portion of the rotation member (15) is immersed into the oil stored in the bottom part (5a) of the first chamber (4A), and through rotation of the rotation member (15), the oil stored in the bottom part (5a) of the first chamber (4A) is scooped up to be stored in the oil storage part (40).

In addition, in the lubrication structure, it may also be that a power transmission mechanism is disposed in the first chamber (4A), and the rotation member (15) is a component of the power transmission mechanism.

Moreover, in the lubrication structure, it may also be that an electric motor (M, G) is disposed in the second chamber (4B), and the power transmission mechanism transmits power input from an internal combustion mechanism (E) outside the power transmission device (T) and outputs the power out of the power transmission device (T).

In addition, in the lubrication structure, it may also be that the through hole (3a) of the partition wall (3) is a hole through which a parking rod (31) passes, the parking rod being included in a vehicle parking mechanism (30).

In addition, in the lubrication structure, it may also be that, the through hole (3a) is in a shape with a diameter decreasing from the second chamber (4B) toward the first chamber (4A).

In addition, in the lubrication structure, it may also be that a cooling oil passage (60) supplying oil for cooling the electric motor (M, G) is provided at an upper part of the second chamber (4B), and the oil supplied from the cooling oil passage (60) to the electric motor (M, G) passes through the through hole (3a).

In addition, in the lubrication structure, it may also be that the oil adhering to a surface of the partition wall (3) on a second chamber (4B) side and flowing down passes through the through hole (3a).

According to the invention, in the lubrication structure of the power transmission device, even in the case where the rotation speed of the rotation member, such as a final gear, scooping up the oil in the case is low, the oil in the required amount for lubrication can be supplied by guiding in the oil from the adjacent motor chamber. Accordingly, a lubrication system of a relatively cheap and simple configuration can be realized without using an expensive and complicated baffle plate. Through the improvement of the lubrication structure of the power transmission device, the size as well as the weight of the vehicle or the power transmission device can be reduced, and the energy efficiency can be improved.

In the following, the embodiments of the invention will be described with reference to the accompanying drawings. In the following description, "forward/front" and "rearward/rear" respectively refer to the forward direction and the backward direction of the vehicle in the state in which a power transmission device T (case 2) to be described afterwards is mounted in the vehicle, and "left" and "right" respectively refer to the left and the right in the state in which the vehicle is in the forward direction in the same state. In addition, the directions indicated by the arrow signs of "front", "rear", "left", "right" in the respective drawings are the same.

[Basic Configuration of the Vehicle Power Transmission Device]

FIG. 1 is a skeleton view illustrating a basic configuration of a vehicle power transmission device including a lubrication structure according to an embodiment of the invention. As shown in the same figure, the power transmission device T includes an input shaft 11 and a counter shaft (output shaft) 12 disposed in parallel. The input shaft 11 is serially connected with a crank shaft 13 of an engine (internal combustion mechanism) E as a driving source of the vehicle. The counter shaft 12 is connected with left and right wheels W via a final drive gear 14, a final driven gear (final gear: rotation member) 15, a differential gear D, and left and right drive shafts (final shafts) 16, 16. In addition, a first drive gear 17 supported by the input shaft 11 via a hydraulic clutch C is engaged with a first driven gear 18 fixed to the counter shaft 12.

Also, in the power transmission device T, the motor M and a generator G as an electric motor are disposed coaxially, and a generator shaft 20 is relatively rotatably fit with the interior of a motor shaft 19 that is hollow. A second drive gear 21 fixed to the motor shaft 19 is engaged with a second driven gear 22 fixed to the counter shaft 12, and a generator drive gear 23 fixed to the input shaft 11 is engaged with a generator driven gear 24 fixed to the generator shaft 20. The motor M and the generator G are connected with a battery B.

[Lubrication Structure of the Power Transmission Device]

Figure 2:
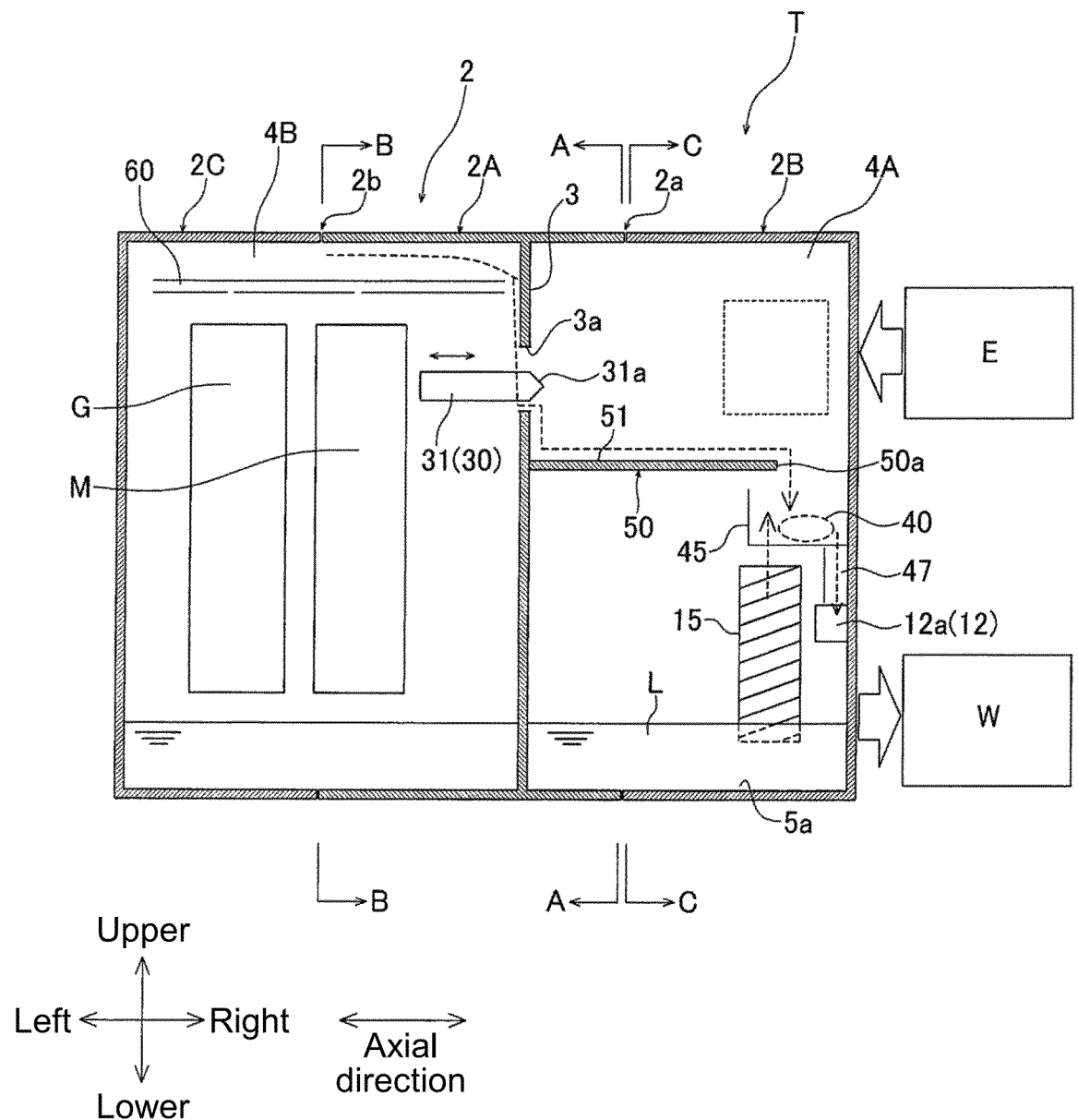
FIG. 2 is a schematic view illustrating an arrangement of components of the power transmission device of the embodiment.

In the following, a lubrication structure of the power transmission device according to an embodiment of the invention will be described. FIG. 2 is a schematic view illustrating an arrangement of components of the power transmission device of the embodiment. As shown in the same figure, the power transmission device T of the embodiment includes the case 2 accommodating the components of the power transmission device T. The case 2 is formed by three components, that is: an intermediate case 2A disposed in the middle of the power transmission device T in the axial direction; a flywheel case 2B attached to a side in the axial direction with respect to the intermediate case 2A (right side in the left-right direction in the vehicle-mounted state); and a motor case 2C attached to the other side in the axial direction with respect to the intermediate case 2A (left side in the left-right direction in the vehicle-mounted state). In addition, an internal space formed by the intermediate case 2A and the flywheel case 2B forms a gear chamber (first chamber) 4A accommodating the components of a gear mechanism (power transmission mechanism) of the power transmission device T, and an internal space formed by the intermediate case 2A and the motor case 2C forms a motor chamber (second chamber) 4B accommodating the motor M and the generator G. A partition wall 3 is formed in the intermediate case 2A, and the gear chamber 4A and the motor chamber 4B are partitioned by the partition wall 3. A through whole 3a for communication between the gear chamber 4A and the motor chamber 4B is provided on the partition wall 3. A tip end part 31a of a parking rod 31 disposed to be able to move forward or backward in the motor chamber 4B is inserted through the through hole 3a and protrudes toward the side of the gear chamber 4A.

In the gear chamber 4A, an oil storage part 40 storing oil in the gear chamber 4A and a gutter member 50 which extends from a part on the partition wall 3 below the through hole 3a into the gear chamber 4A and in which a tip end part 50a is disposed above the oil storage part 40 are provided. The oil storage part 40 is provided on a wall part (the inner wall of the flywheel case 2B) that is not the partition wall 3 in the gear chamber 4A, and does not contact the partition wall 3.

It is configured that the motor M and the generator G as the electric motor are disposed in the motor chamber 4B, a cooling pipe (cooling oil passage) 60 supplying the oil for cooling the motor M and the generator G is disposed at the upper part of the motor M and the generator G inside the motor chamber 4B, and a portion of the oil supplied from the cooling pipe 60 to the motor M and the generator G passes through the through hole 3a.

In addition, in the lubrication structure of the embodiment, the oil passing through the through hole 3a from the motor chamber 4B and flowing into the gear chamber 4A is received by the gutter member 50 and introduced to the oil storage part 40, the oil is stored in the oil storage part 40, and the oil storage part 40 has a communication passage (lubrication oil passage) 47 on the wall part of the case 2 (flywheel case 2B) on which the oil storage part 40 is provided, and introduces the oil toward a bearing 12a of the counter shaft 12 that is the lubricated part inside the gear chamber 4A via the communication passage 47.

A sidewall of the oil storage part 40 is formed by a wall part (inner surface) of the flywheel case 2B, and another sidewall of the oil storage part 40 is formed by a baffle plate 45.

In addition, oil L is stored in a bottom part 5a of the gear chamber 4A, the final driven gear 15 that is the rotation member is provided in the gear chamber 4A, and a portion of the final driven gear 15 is immersed into the oil stored in the bottom part 5a of the gear chamber 4A. In addition, through the rotation of the final driven gear 15, the oil stored in the bottom part 5a of the gear chamber 4A is scooped up to be stored in the oil storage part 40.

Figure 3:
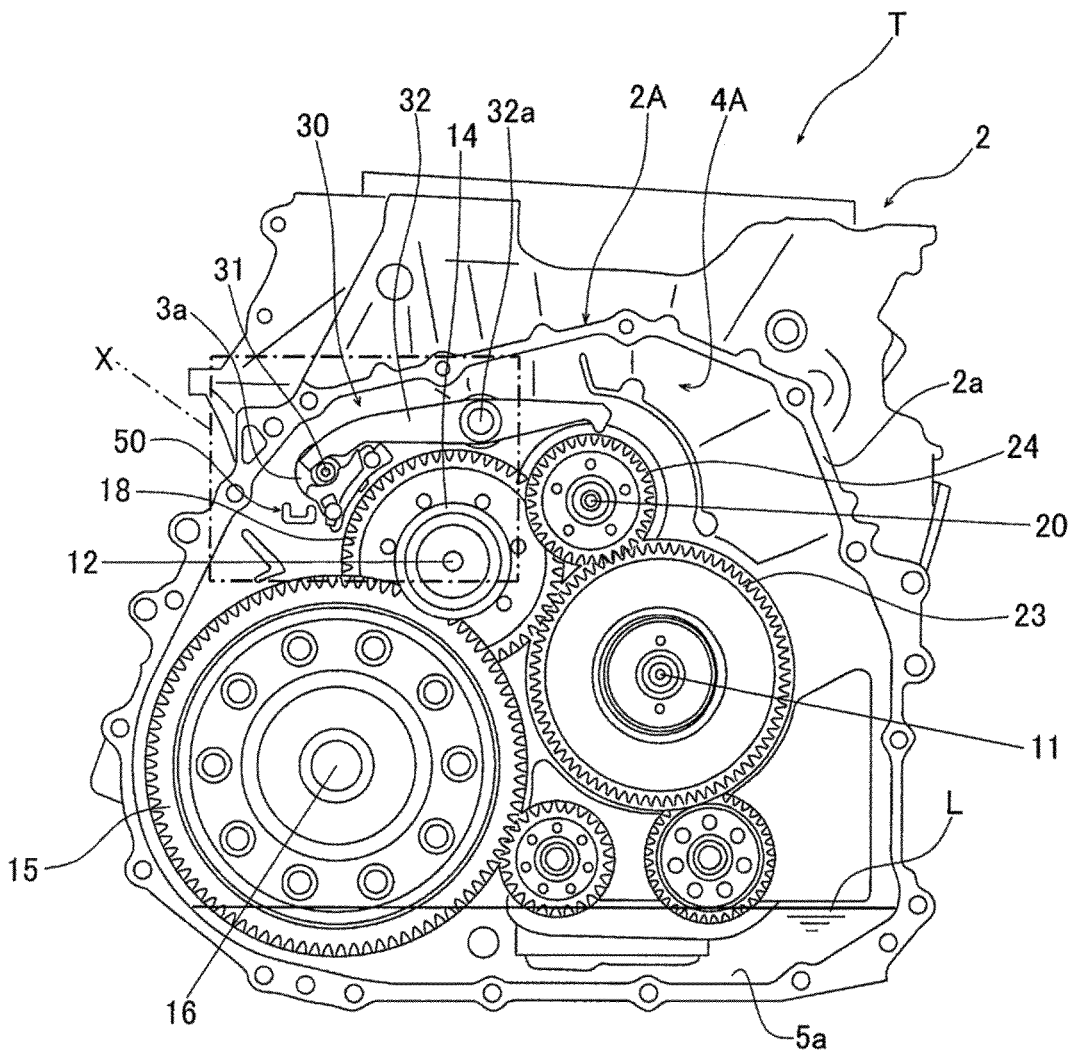
FIG. 3 is a view illustrating a position corresponding to an A-A arrow view of FIG. 2 in the power transmission device, and is a view illustrating an intermediate case side from a mating surface between the intermediate case and a flywheel case.
Figure 4:
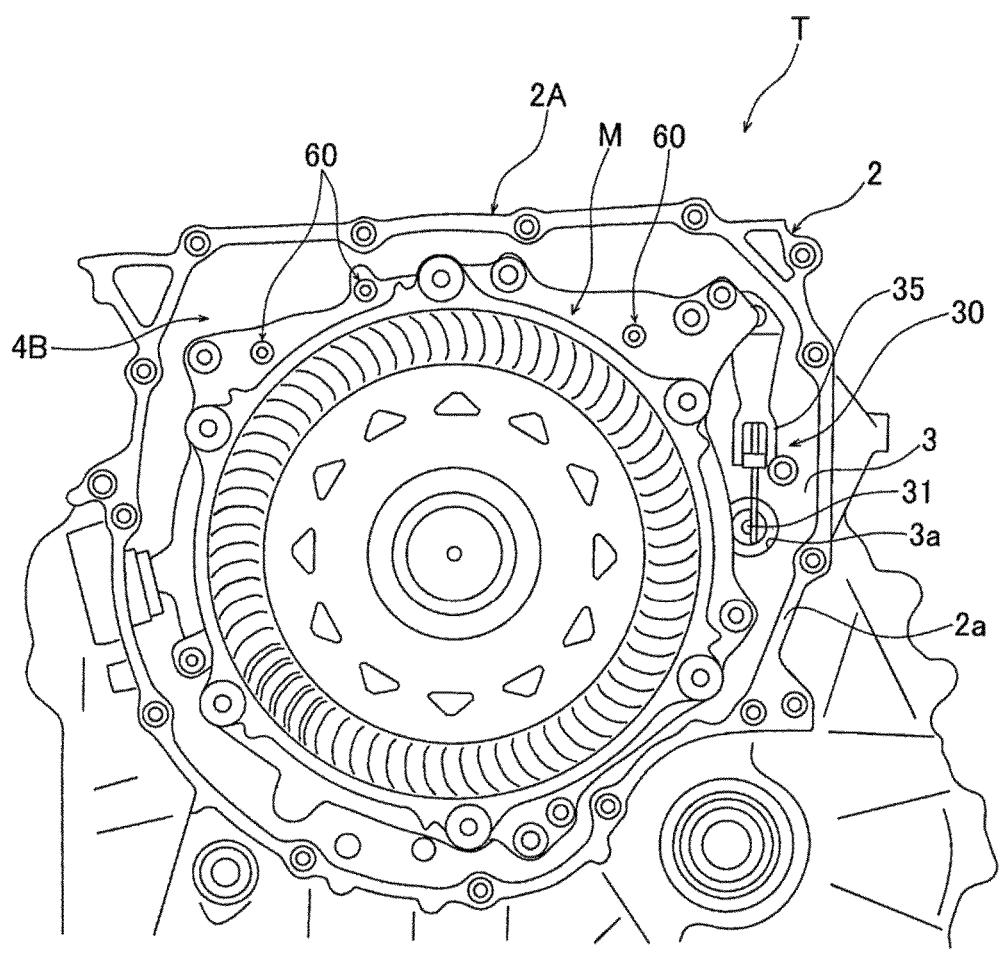
FIG. 4 is a view illustrating a position corresponding to a B-B arrow view of FIG. 2 in the power transmission device, and is a view illustrating the intermediate case side from a mating surface between the intermediate case and a motor case.

Then, with reference to FIGS. 3 to 8, the detailed configuration of each part of the power transmission device is described. FIG. 3 is a view illustrating a position corresponding to an A-A arrow view of FIG. 2, and is a view illustrating the side of the intermediate case 2A from a mating surface 2a between the intermediate case 2A and the flywheel case 2B. In the same figure, the components, such as gears, inside the gear chamber 4A are also shown. In addition, FIG. 4 is a view illustrating a position corresponding to a B-B arrow view of FIG. 2, and is a view illustrating the side of the intermediate case 2A from a mating surface 2b between the intermediate case 2A and the motor case 2C. In the same figure, the components, such as the motor M, the generator G, and the cooling pipe 60, inside the motor chamber 4B are also shown.

The intermediate case 2A, the flywheel case 2B, and the motor case 2C are all cast objects, and the intermediate case 2A and the flywheel case 2B abut against each other on the mating surface 2a and are fixed through bonding of bolts not shown herein. Similarly, the intermediate case 2A and the motor case 2C abut against each other on the mating surface 2b and are fixed through bonding of bolts not shown herein. In addition, although the detailed illustration of the through hole 3a provided on the partition wall 3 of the intermediate case 2A is omitted, the diameter dimension (inner diameter dimension) thereof is formed to be greater on the side of the motor chamber 4B than the side of the gear chamber 4A, and the diameter of the through hole 3a gradually decreases from the side of the motor chamber 4B toward the side of the gear chamber 4A.

As shown in FIGS. 2 and 4, the motor M and the generator G as the electric motor are disposed in the motor chamber 4B, the cooling pipe (cooling oil passage) 60 supplying the oil for cooling the motor M and the generator G is at the upper part of the motor M and the generator G inside the motor chamber 4B. In addition, the through hole 3a as well as a detent part 35 or a parking rod 31 of the parking mechanism 30 inserted through the through hole 3a is disposed on the partition wall 3 of the side parts of the motor M and the generator G. The oil supplied from an oil pump (not shown) operating through the rotation of the engine E to the motor chamber 4B is supplied from the cooling pump 60 to the motor M and the generator G, and a portion of the oil passes through the through hole 3a to be guided from the motor chamber 4B to the gear chamber 4A.

As shown in FIGS. 2 and 3, the final driven gear 15 having a large diameter and supported by the drive shaft 16 and the final drive gear 14 having a small diameter on the counter shaft 12 and engaged with the final driven gear 15 are provided inside the gear chamber 4A. In addition, various gears, such as the first driven gear 18 provided coaxially with the final drive gear 14, the generator driven gear 24 provided on the generator shaft 20, the generator drive gear 23 provided on the input shaft 11, which form the gear mechanism of the power transmission device T are accommodated.

In addition, the parking mechanism 30 is provided in the gear chamber 4A. The parking mechanism 30 is formed by a parking pawl 32 swingably supported by a support shaft 32a and the parking rod 31 swinging the parking pawl 32. The parking pawl 32 is supported to be swingable between a lock position engaged with the generator driven gear (parking gear) 24 and a release position at which the engagement to the generator driven gear 24 is released. The parking rod 31 is disposed to be able to move forward or backward in the motor chamber 4B, and a portion on the side of the tip end part 31a of the parking rod 31 is disposed to pass through the through hole 3a of the partition wall 3 to be able to protrude into the gear chamber 4A. With the parking rod 31 moving forward the side of the gear chamber 4A, the tip end part 31a of the parking rod 31 presses the parking pawl 32 and swings the parking pawl 32 to the lock position to enter a parking lock state. Meanwhile, with the parking rod 31 retreating to the motor chamber 4B, the parking pawl 32 pressed by the tip end part 31a of the parking rod 31 returns to the release position, and the parking lock enters a released state.

Figure 5:
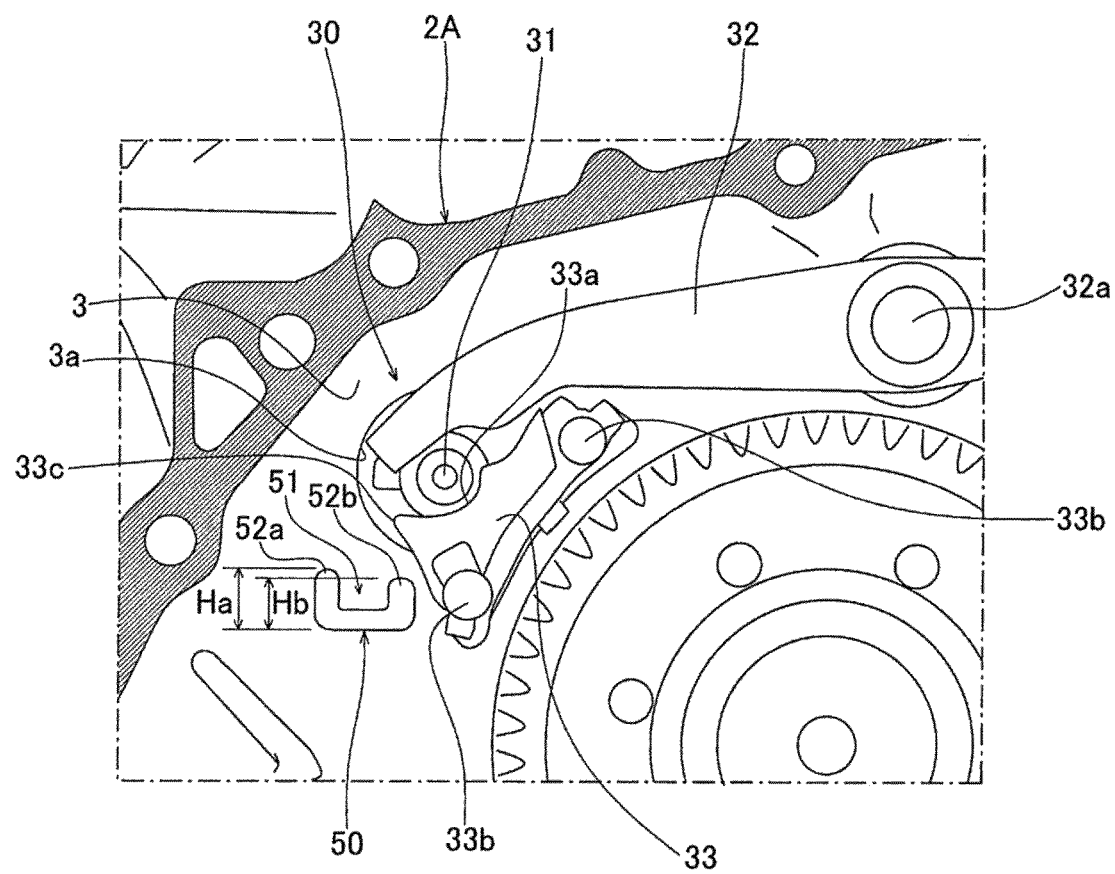
FIG. 5 is a partially enlarged view of an X portion of FIG. 3.
Figure 6:
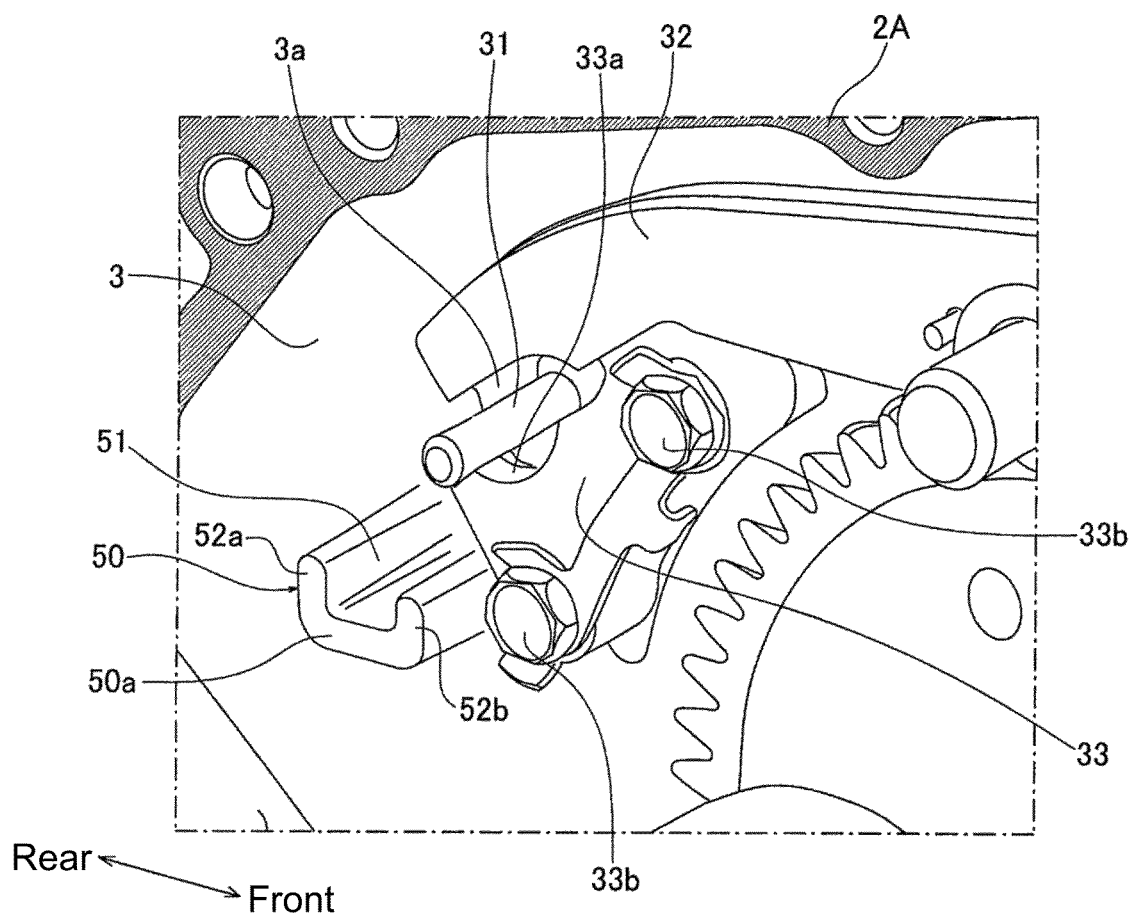
FIG. 6 is a partially enlarged perspective view illustrating a through hole in a gear chamber and a periphery of the through hole, when viewed from the oblique top.

FIG. 5 is a partially enlarged view of an X portion of FIG. 3. In addition, FIG. 6 is a partially enlarged perspective view illustrating the through hole 3a in the gear chamber 4A and a periphery of the through hole 3a when viewed obliquely from the top. As shown in the figures, on the lower side of the through hole 3a and the parking rod 31 in the gear chamber 4A, a parking holder (holder member) 33 for supporting the parking rod 31 is provided. The parking holder 33 is fixed to the partition wall 3 from the front side of the through hole 3a to the lower side through the fastening of bolts 33b. An upper surface 33a of the parking holder 33 formed in a curved surface shape is disposed to cover the front side and the lower side of the tip end part 31a of the parking rod 31.

On the lower side (bottom) of the through hole 3a on the partition wall 3, the gutter member 50 having an elongated shape and extending into the gear chamber 4A is provided. The gutter member 50 linearly extends in a lateral direction from the partition wall 3 toward the side of the flywheel case 2B in the gear chamber 4A. The tip end part 50a of the gutter member 50 is disposed above the oil storage part 40. The cross-section of the gutter member 50 in the longitudinal direction is formed in a substantially U shape, and a concave part 51 that is an oil flow passage in a concave shape is provided on the upper surface thereof. In addition, at least the upper surface (the bottom surface of the concave part 51) of the gutter member 50 is in an inclined surface shape inclined gradually downward from the side of the partition wall 3 (root side) toward the side of the tip end part 50a.

In addition, in the gutter member 50, from the side of the partition wall 3 (root side) toward the side of the tip end part 50a, the height dimension in the upper-lower direction gradually decreases, and the width dimension in the left-right direction (width direction) gradually decreases whereas the component thickness dimension gradually decreases, so that the width dimension (inner width dimension) of the concave part (oil flow passage) 51 gradually increases.

In addition, as shown in FIG. 5, in the gutter member 50, between standing walls 52a, 52b on two sides in the width direction forming the concave part (oil flow passage) 51, a height dimension Ha of the standing wall 52a on the rear side of the vehicle, which is one of the standing walls, is greater than a height dimension Hb of the standing wall 52b on the front side of the vehicle, which is the other of the standing walls. That is, Ha>Hb. Therefore, regarding the depth of the concave part (oil flow passage) 51 of the gutter member 50, the depth dimension on the rear side of the vehicle is greater than the depth dimension on the front side. In addition, regarding the thickness of the cross-section of the gutter member 50, the thickness at the rear in the vehicle front-rear direction is greater than the thickness at the front.

In addition, as shown in FIG. 5, the gutter member 50 is below the through hole 3a of the partition wall 3, and is located behind the center of the through hole 3a in the vehicle front-rear direction. That is, the gutter member 50 is located at an obliquely lower position on the vehicle rear side with respect to the through hole 3a on the partition wall 3. In addition, an end surface 33c of the parking holder 33 is disposed above the gutter member 50 (extending in an eaves-shape).

Figure 7:
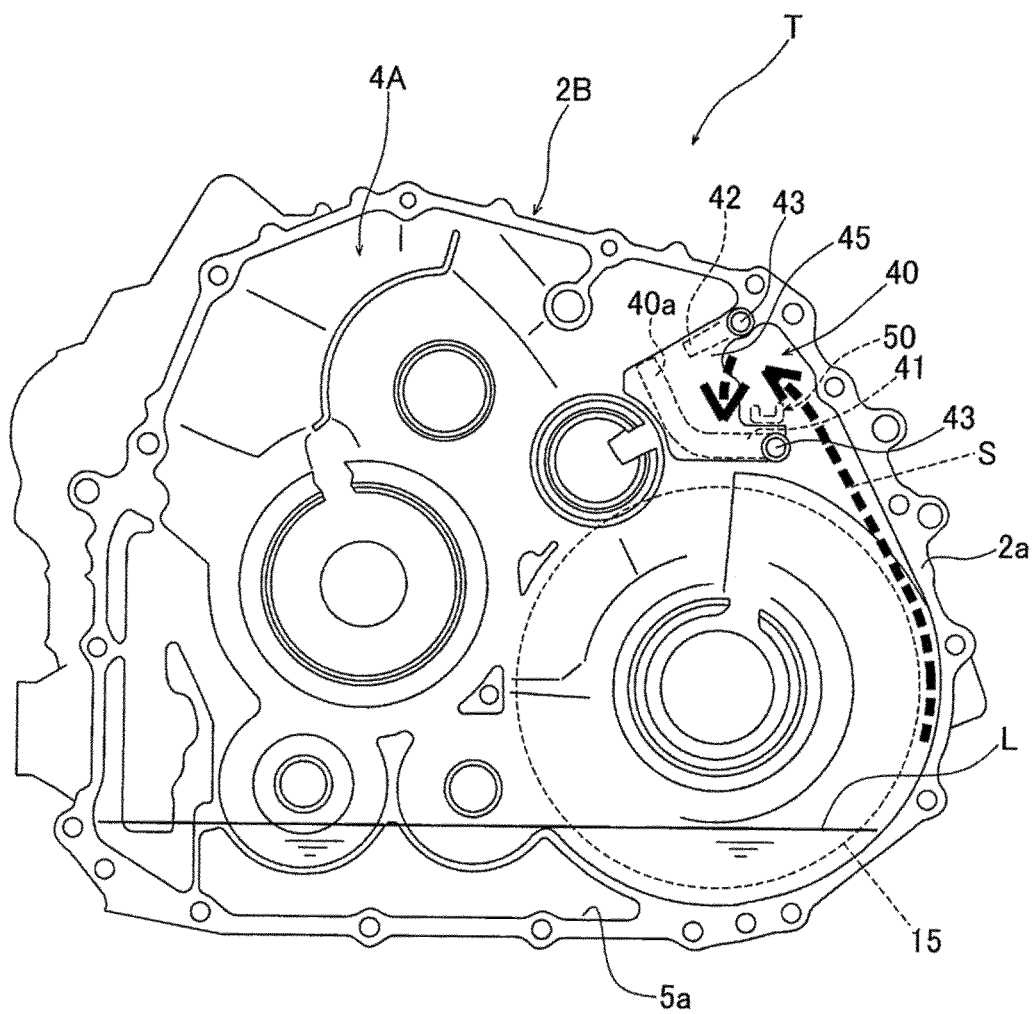
FIG. 7 is a view illustrating a position corresponding to a C-C arrow view of FIG. 2 in the power transmission device, and is a view illustrating a flywheel case side from the mating surface between the intermediate case and the flywheel case.
Figure 8:
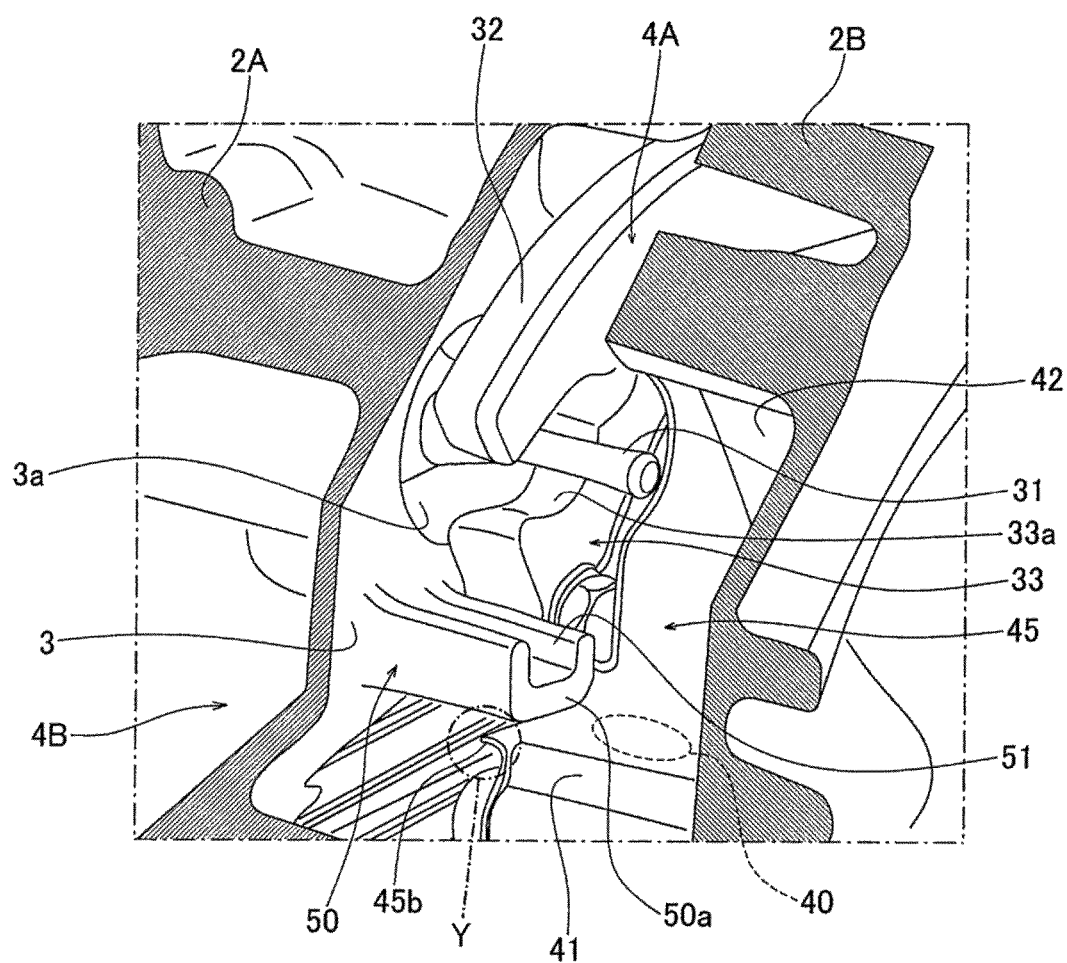
FIG. 8 is a perspective view illustrating an arrangement configuration of a through hole and a gutter member provided on a partition wall side and an oil storage part provided on an inner surface side of the flywheel case.

FIG. 7 is a view illustrating a position corresponding to a C-C arrow view of FIG. 2, and is a view illustrating the side of the flywheel case 2B from the mating surface 2b between the intermediate case 2A and the flywheel case 2B. In the same figure, components such as the gears in the gear chamber 4A are omitted, and only the baffle plate 45 attached to the oil storage part 40 is shown. As reference, the arrangement of the gutter member 50 and the final driven gear 15 on the side of the intermediate case 2A is also shown as dotted lines in FIG. 7. In addition, FIG. 8 is a perspective view illustrating the arrangement configuration of the through hole 3a and the gutter member 50 provided on the side of the partition wall 3 and the oil storage part 40 provided on the inner surface side of the flywheel case 2B.

As shown in these figures, the oil storage part 40 storing the oil in the gear chamber 4A is provided on the inner wall (a wall surface not the partition wall 3) of the flywheel case 2B in the gear chamber 4A and not in contact with the partition wall. As shown in FIG. 8, the oil storage part 40 is provided at a position opposite to the through hole 3a of the partition wall 3 and the gutter member 50.

In addition, one sidewall of the oil storage part 40 (the sidewall on the side of the flywheel case 2B) is formed by the wall part (inner surface) of the flywheel case 2B. A bottom surface 40a of the oil storage part 40 is located higher than the bottom part 5a of the gear chamber 4A, and is formed by a first rib 41 extending from the wall part of the flywheel case 2B. In addition, another sidewall (the sidewall on the side of the partition wall 3) of the oil storage part 40 is formed by the baffle plate 45 attached to the first rib 41. In addition, at a position above the oil storage part 40 and higher than the gutter member 50, a second rib 42 extending from the wall part (inner surface) of the flywheel case 2B is provided. In addition, the baffle plate 45 is attached to both of the first rib 41 and the second rib 42 so as to be connected between the first rib 41 and the second rib 42.

The baffle plate 45, for example, is a substantially plate-shaped member formed by metal, such as an iron plate or an aluminum plate, and is fixed to the tip of the first rib 41 and the tip of the second rib 42 through fastening of bolts 43. Through the first rib 41, the second rib 42, and the baffle plate 45, the oil storage part 40 storing oil in the gap with the inner surface of the flywheel case 2B is formed. In addition, as shown in a portion Y of FIG. 8, a portion opposite to the tip end part 50a of the gutter member 50 in the baffle plate 45 forms a bent part 45b bent toward the partition wall 3.

Figure 9:
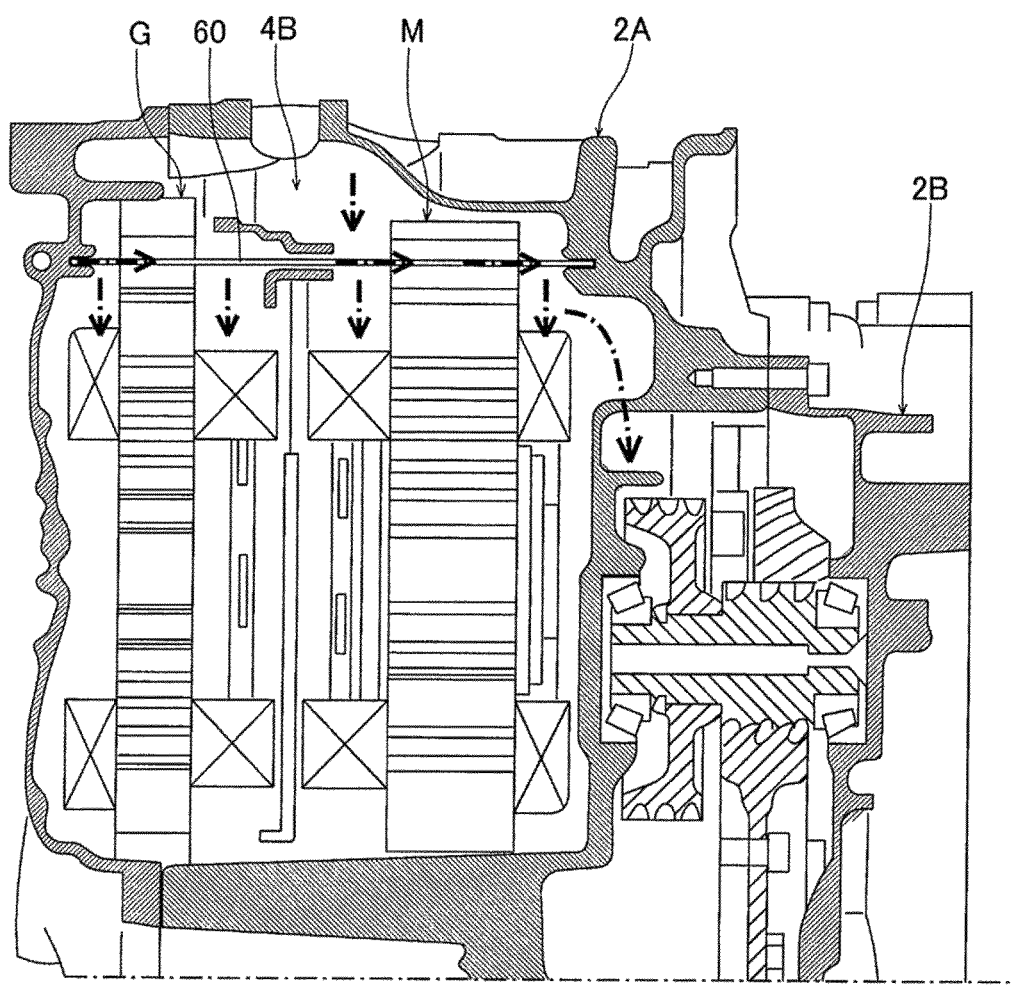
FIG. 9 is a view illustrating an oil flow in the power transmission device, and is a view illustrating an oil flow in a motor chamber.
Figure 10:
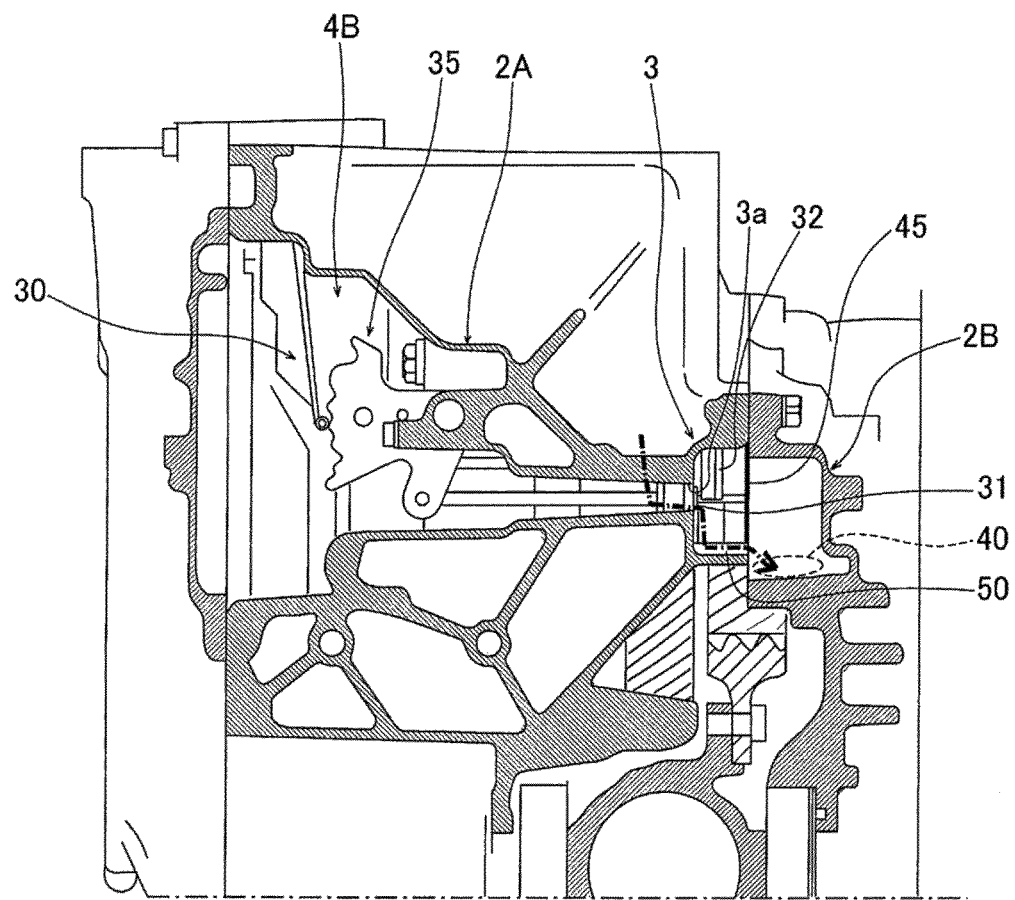
FIG. 10 is a view illustrating an oil flow in the power transmission device, and is a view illustrating an oil flow from the motor chamber to the gear chamber.
Figure 11:
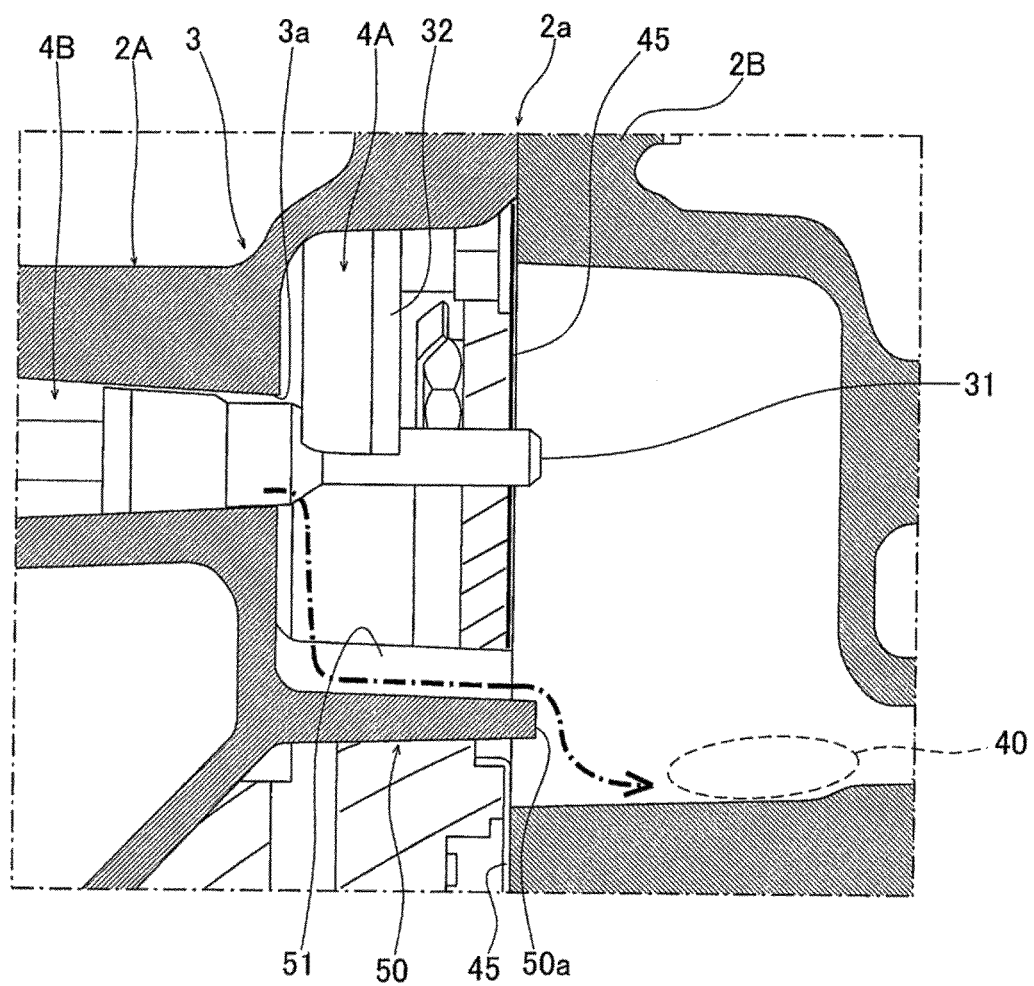
FIG. 11 is a view illustrating an oil flow in the power transmission device, and is a view illustrating an oil flow from the motor chamber to the gear chamber.
Figure 12:
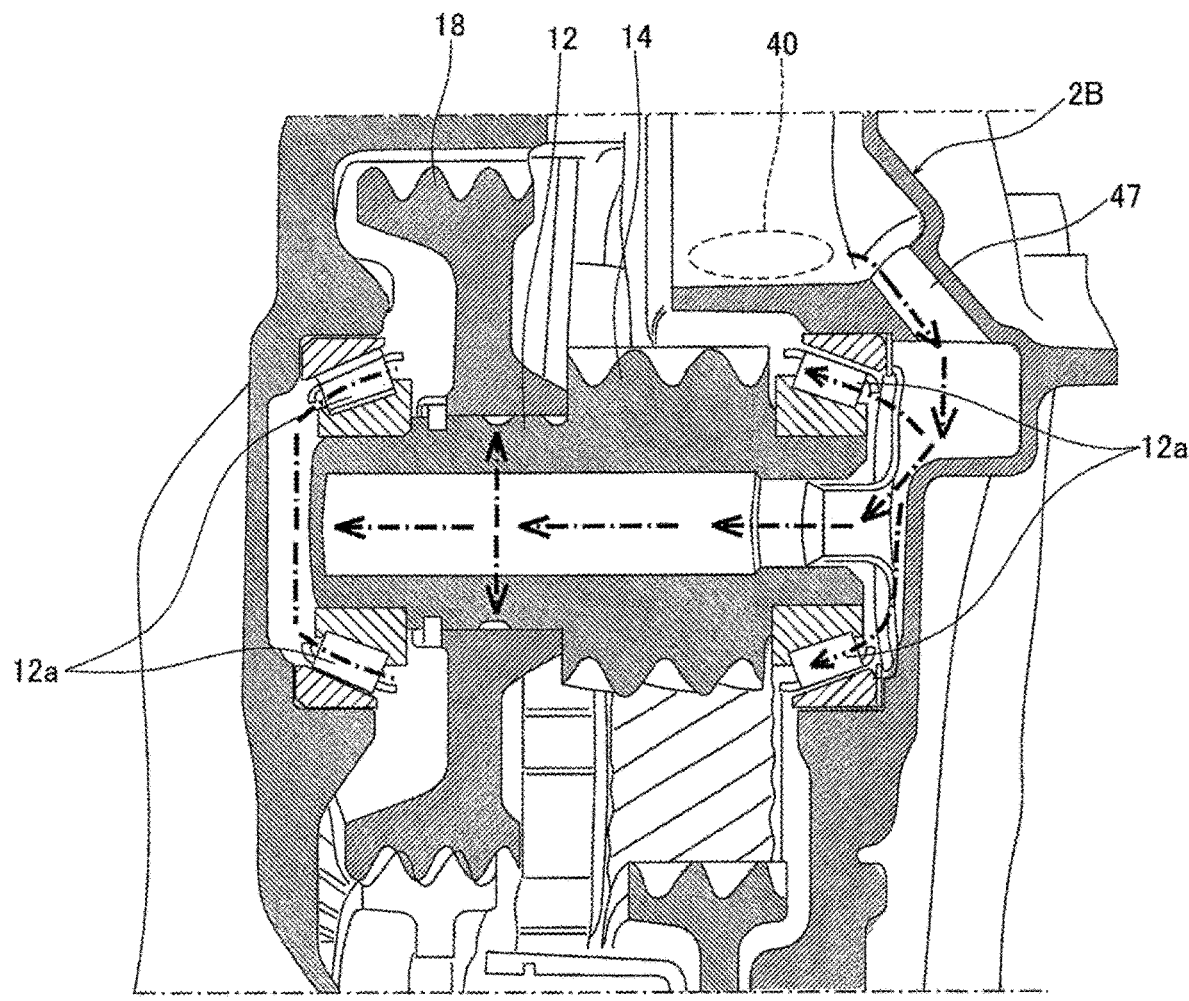
FIG. 12 is a view illustrating an oil flow in the power transmission device, and is a view illustrating an oil flow from the oil storage part in the gear chamber to a bearing of a counter shaft as a lubricated part.

In the following, the flow of the oil in the power transmission device T with the above configuration is described. FIGS. 9 to 12 are views for illustrating the flow of the oil in the power transmission device T. FIG. 9 is a view illustrating the flow of the oil in the motor chamber 4B. FIGS. 10 and 11 are views illustrating the flow of the oil from the motor chamber 4B to the gear chamber 4A. FIG. 12 is a view illustrating the flow of the oil from the oil storage part 40 in the gear chamber 4A to the bearing 12a of the counter shaft 12 as a lubricated part.

In the lubrication structure according to the embodiment, as shown in FIG. 9, the cooling oil is supplied from the cooling pipe (cooling oil passage) 60 at the upper part of the motor chamber 4B to the motor M and the generator G in the motor chamber 4B. In addition, a portion of the oil hits the stator of the motor M and the generator G, bounces off, and scatters toward the through hole 3a of the partition wall 3 shown in FIG. 4, so that the oil passes through the through hole 3a and enters the gear chamber 4A. In addition, as shown in FIG. 10, the oil supplied from the cooling pipe 60 enters the gear chamber 4A from the through hole 3a via the parking rod 31 in the motor chamber 4B.

As shown in FIG. 11, the oil entering the gear chamber 4A from the through hole 3a flows downward from an exit of the through hole 3a on the side of the gear chamber 4A, and is received by the gutter member 50. The oil received by the gutter member 50 is guided to the oil storage part 40 along the concave part 51 of the gutter member 50 and stored in the oil storage part 40. The oil stored in the oil storage part 40, as shown in FIG. 12, is introduced to the bearing 12a of the counter shaft 12, which is the lubricated part in the gear chamber 4A, through the communication passage (lubrication oil passage) 47 provided on the wall part of the flywheel case 2B that forms one sidewall of the oil storage part 40. By doing so, the bearing 12a is lubricated by the oil stored in the oil storage part 40.

Also, as shown in FIG. 7, in the state in which the vehicle is traveling, the oil L stored in the bottom part 5a of the gear chamber 4A is scooped up by the final driven gear 15 that rotates. As indicated by an arrow sign S in the same figure, the oil L that is scooped up is received by the second rib 42 and stored in the oil storage part 40.

In this way, the lubrication structure of the embodiment is provided with the case 2 accommodating the components of the power transmission device T, the partition wall 3 splitting the interior of the case 2 into the gear chamber 4A and the motor chamber 4B, and the oil storage part 40 storing the oil in the gear chamber 4A. In addition, the oil storage part 40 is provided at the wall part that is not the partition wall 3 in the gear chamber 4A and is not in contact with the partition wall 3. In the partition wall 3, the through hole 3a for communication between the gear chamber 4A and the motor chamber 4B and the gutter member 50 which extends into the gear chamber 4A below the through hole 3a and in which the tip end part 50a thereof is disposed above the storage part 40 are provided.

According to the lubrication structure of the embodiment, the oil guided from the motor chamber 4B into the gear chamber 4A through the through hole 3a of the partition wall 3 is guided to the oil storage part 40 along the gutter member 50. Therefore, for the oil storage part 40 provided at a wall part not the partition wall 3 of the case 2 and not in contact with the partition wall 3, a greater amount of oil can be stored.

That is, although the oil scooped up from the final driven gear 15 when the vehicle is traveling normally is stored in the oil storage part 40 and used for lubrication, when the traveling speed is low, the final driven gear 15 cannot scoop up sufficient oil, and the oil cannot be stored sufficiently in the oil storage part 40. Therefore, in the conventional lubrication structure, a baffle plate that is expensive and has a complicated shape is used in order to facilitate the efficiency of collecting oil into the oil storage part 40. Comparatively, if the lubrication structure of the embodiment (the invention) is adopted, the cooling oil supplied from the oil pump (not shown) operating through the rotation of the engine E to the motor chamber 4B is supplied to the gear chamber 4A through the through hole 3a of the partition wall 3. Therefore, even if the traveling speed of the vehicle is low, for example, the oil can be guided to the gear chamber 4A through the through hole 3a of the partition wall 3.

In addition, by efficiently guiding the oil guided to the gear chamber 4A through the through hole 3a of the partition wall 3 to the oil storage part 40 by using the gutter member 50, the supply amount of the lubrication oil at the time of traveling at a low speed can be increased effectively. Accordingly, since it suffices to use a baffle plate 45 that is cheaper and has a simpler structure, instead of using a baffle plate that is expensive and has a complicated shape or structure, it is possible to both stably supply oil and reduce the cost.

Also, in the lubrication structure of the embodiment, the concave part 51 as a concave-shaped oil flow passage is provided on the upper surface of the gutter member 50. In this way, by providing the concave-shaped oil flow passage on the upper surface of the gutter member 50, the oil can be efficiently guided to the oil storage part 40 by using the gutter member 50.

In addition, in the lubrication structure of the embodiment, at least the upper surface (the bottom surface of the concave part 51) of the gutter member 50 is inclined downward from the side of the partition wall 3 toward the side of the tip end part 50*a*. According to the configuration, the oil can be more efficiently guided to the oil storage part 40 by using the inclination of the upper surface of the gutter member 50 (the bottom surface of the concave part 51). The gutter member 50 of the embodiment is a portion integral with the intermediate case 2A and manufactured as a casting object at the time of manufacturing the intermediate case 2A. Therefore, due to the cast gradient resulting from a casting mold, the gutter member 50 is thick on the root side thereof and is thin on the side of the tip end part 50*a*. In addition, since the upper surface (the concave part 51) of the gutter member 50 is mainly used to guide the oil, it is possible to utilize the inclination resulting from the cast gradient to efficiently guide the oil to the oil storage part 40.

In addition, in the lubrication structure of the embodiment, the tip end part 50*a* of the gutter member 50 is located above the oil storage part 40 and not in contact with the oil storage part 40. According to the configuration, with the tip end part 50*a* of the gutter member 50 located above the oil storage part 40 (at a separated position thereabove), the oil guided to the oil storage part 40 by using the gutter member 50 can be collected in the oil storage part 40 without spilling. In addition, if the gutter member 50 contacts the baffle plate 45, component fatigue, etc., may occur due to repetitive contacts therebetween caused by the vibration at the time when the vehicle is traveling, and problems may occur. However, in the embodiment, the tip end part 50*a* of the gutter member 50 does not contact the baffle plate 34. Therefore, such problem does not occur.

In addition, in the gutter member 50 of the lubrication structure of the embodiment, from the side of the partition wall 3 toward the side of the tip end part 50*a*, the height dimension gradually decreases, and the width dimension gradually decreases whereas the component thickness dimension gradually decreases, so the width dimension of the concave part 51 (the width dimension of the inner surface) is formed to gradually increase. Accordingly, the gutter member 50 is configured that the total thickness in the vehicle vertical direction is reduced from the root side toward the side of the tip end part 50*a*, the total width in the vehicle front-rear direction decreases, the wall thickness of the gutter member 50 also decreases, and the width of the groove of the concave part 51 increases. In addition, in the cross-section of the gutter member 50, the thickness at the rear in the vehicle front-rear direction is greater than the thickness at the front.

According to the configuration, in the gutter member 50, due to the gradient of the cast object, the thickness decreases even though the total width and the total thickness decrease. In addition, the width of the oil passage of the concave part 51 increases. In this way, since the groove width of the concave part 51 increases toward the tip end part 50*a* of the gutter member 50, it is difficult for the oil flowing through the concave part 51 (the oil flow passage) of the gutter member 50 to spill. Thus, the oil can be efficiently collected by the gutter member 50.

In addition, in the lubrication structure of the embodiment, the gutter member 50 is below the through hole 3*a* of the partition wall 3, and is located behind the center of the through hole 3*a* in the vehicle front-rear direction.

In the embodiment, the parking holder 33 for the parking rod 31 is provided in front of the exit of the through hole 3*a* on the side of the gear chamber 4A. Therefore, the oil having been transmitted along the parking rod 31 drops to the upper surface 33*a* of the parking holder 33 and is then delivered to the gutter member 50 and guided to the oil storage part 40. According to such configuration, the oil can be stably collected in the oil storage part 40 regardless of whether the vehicle accelerates, decelerates, or stops. Since the gutter member 50 is a cast object, there is a shape limitation due to the relationship of the cast gradient, and the width of the gutter member cannot be very wide. Therefore, if it is configured that the oil is directly collected in the gutter member 50 (without being collected through the parking holder 33), the oil may spill from the gutter member 50 when the vehicle accelerates or decelerates.

In addition, when the vehicle is traveling, the parking lock of the parking mechanism 30 is released, but the parking rod 31 protrudes toward the side of the gear chamber 4A with respect to the partition wall 3. Therefore, the oil guided from the motor chamber 4B to the gear chamber 4A along the parking rod 31 is received by the parking holder 33. In addition, since the rear part of the parking holder 33 in the vehicle front-rear direction is located at the upper part of the gutter member 50, the oil drops from the parking holder 33 to the gutter member 50 to be recycled.

In addition, in the embodiment, the oil passing through the through hole 3*a* from the motor chamber 4B and flowing into the gear chamber 4A is received by the gutter member 50 and introduced to the oil storage part 40, the oil is stored in the oil storage part 40, and the oil storage part 40 has a communication passage (lubrication oil passage) 47 on the wall part of the flywheel case 2B on which the oil storage part 40 is provided, and introduces the oil to the bearing 12*a* of the counter shaft 12 that is the lubricated part inside the gear chamber 4A via the communication passage 47.

According to the configuration, by storing the oil temporarily in the oil storage part 40 instead of from the gutter member 50 directly, lubrication can be performed by stable oil supply regardless of whether the oil supply is large or small due to the vehicle speed, etc.

In addition, in the lubrication structure of the embodiment, the bearing 12*a* of the counter shaft 12 is the lubricated part of the lubrication target by the oil of the oil storage part 40. Since the bearing 12*a* is disposed at a high position in the gear chamber 4A, if a supply pump dedicated for the bearing 12*a* is not provided, it is difficult to supply oil, and the lubrication amount tends to be insufficient. Comparatively, according to the lubrication structure of the embodiment, lubrication can be carried out by supplying the oil from the oil storage part 40 to the bearing 12*a*. Therefore, it does not require a supply pump dedicated for the bearing 12*a*. Thus, the manufacturing cost of the power transmission device T can be reduced, the configuration can be simplified, and the weight can be reduced.

In addition, in the lubrication structure of the embodiment, one sidewall of the oil storage part 40 is formed by the wall part (inner surface) of the flywheel case 2B, and the bottom surface 40*a* of the oil storage part 40 is located at a position higher than the bottom part 5*a* of the gear chamber 4A and formed by the first rib 41 extending from the wall part of the flywheel case 2B. In addition, another sidewall of the oil storage part 40 is formed by the baffle plate 45 attached to the first rib 41. In addition, the second rib 42 extending from the wall part of the flywheel case 2B is provided above the oil storage part 40 and higher than the gutter member 50. In addition, the baffle plate 45 is attached to the first rib 41 and the second rib 42.

In this way, the oil storage part 40 according to the embodiment is formed by using the wall part (inner surface) of the flywheel case 2B. By integrally forming the second rib 42 that is the wall part of the oil storage part 40 and the first rib 41 that is the bottom part at the time of manufacturing the flywheel case 2B, which is an integrally formed cast object, the manufacturing cost can be lower than that of manufacturing a dedicated case for the oil storage part 40. Although the baffle plate 45 is used as a separate component on the wall part on the side of the motor chamber 4B of the oil storage part 40, even in such case, the baffle plate with a complicated shape like the old type is not required, and the baffle plate 45 can be formed by using a plate material of a simple shape. In addition, the second rib 42 is provided for the oil scooped up from the final driven gear 15 to bounce off and drop to the oil storage part 40. The second rib 42 is integrally formed by a rib as a cast object at the time of manufacturing the flywheel case 2B. By connecting and installing the baffle plate 45 between the first rib 41 and the second rib 42, the oil storage part 40 in a container shape is formed by the first rib 41, the second rib 42, and the baffle plate 45.

In addition, in the lubrication structure according to the embodiment, a portion of the baffle plate opposite to the gutter member 50 forms the bent part 45b bent toward the partition wall 3. That is, the periphery of the gutter member 50 in the baffle plate 45 is bent toward the partition wall 3. The gap between the gutter member 50 and the baffle plate 45 is about 1 mm to 2 mm. Since the gutter member 50 has a cast gradient, the lower surface thereof has an inclination gradient. Therefore, in the case where the flow of the oil flowing through the gutter member 50 does not have momentum, the oil having flown along the gutter member 50 may return to the side of the partition wall 3 along the lower surface. Therefore, by bending the tip end part of the baffle plate 45 toward the partition wall 3, the gap between the tip end part 50a of the gutter member 50 and the baffle plate 45 is reduced. Accordingly, even in the case where the flow of the oil flowing along the gutter member 50 does not have momentum, the oil from the gutter member 50 is easily collected.

In addition, in the lubrication structure of the embodiment, the oil is stored in the bottom part 5a of the gear chamber 4A, the final driven gear 15 that is the rotation member is provided in the gear chamber 4A, and a portion of the final driven gear 15 (a portion on the lower side) is immersed into the oil stored in the bottom part 5a of the gear chamber 4A. In addition, through the rotation of the final driven gear 15, the oil stored in the bottom part 5a of the gear chamber 4A is scooped up to be stored in the oil storage part 40.

In the lubrication structure of the embodiment, the motor M and the generator G as the electric motor are disposed in the motor chamber 4B, and the power transmission device T is configured to transmit the power input from the engine E that is outside and output the power out of the power transmission device T. Therefore, the lubrication structure of the embodiment is a structure suitable for a system of a hybrid vehicle having the engine E and the electric motor (the motor M and the generator G) as the power source of the vehicle.

In addition, in the lubrication structure of the embodiment, the through hole 3a of the partition wall 3 is a hole for the parking rod 31 to pass through. According to the configuration, since the through hole 3a of the partition wall 3 uses the through hole 3a for the parking rod 31, it is not required to provide a hole of a different purpose (a new hole for lubrication) on the partition wall 3. Therefore, the cost of the vehicle or the power transmission device T can be correspondingly reduced.

In addition, in the lubrication structure of the embodiment, the through hole 3a of the partition wall 3 has a shape with the diameter decreasing from the motor chamber 4B toward the gear chamber 4A. Due to the cast gradient of the cast object, the hole diameter of the through hole 3a of the partition wall 3 on the side of the motor chamber 4B is increased, and the hole diameter on the side of the gear chamber 4A is decreased. Since the structure does not require mechanical processing, the cost can be low.

In the lubrication structure of the embodiment, it is configured that the cooling pipe (cooling oil passage) 60 supplying the oil for cooling the electric motor (the motor M and the generator G) is provided at the upper part of the motor chamber 4B, and the oil supplied from the cooling pipe 60 to the motor M and the generator G passes through the through hole 3a. According to the configuration, the cooling oil injected from the cooling pipe 60 hits the stator of the motor M and the generator G and bounces off, and scatters toward the through hole 3a. Accordingly, the cooling oil passes through the through hole 3a and enters the gear chamber 4A.

In the lubrication structure of the embodiment, it is configured that the oil adhering to the surface of the partition wall 3 on the side of the motor chamber 4B and flowing down passes through the through hole 3a. The oil having traveled along the partition wall 3 passes through the through hole 3a and enters the gear chamber 4A. Alternatively, the above lubrication is realized through the oil traveling along the parking rod 31 and entering the gear chamber 4A.

The invention is not limited to the embodiments described above, and various modifications are possible within the scope of the technical ideas described in the claims, the specification and the drawings.

What is claimed is:

1. A lubrication structure of a power transmission device, comprising:
   a case, accommodating components of the power transmission device;
   a partition wall, splitting an interior of the case into a first chamber and a second chamber; and
   an oil storage part, storing oil in the first chamber,
   wherein the oil storage part is provided at a wall part that is not the partition wall in the first chamber,
   the oil storage part is not in contact with the partition wall, and
   the partition wall is provided with:
   a through hole for communication between the first chamber and the second chamber; and
   a gutter member which extends into the first chamber below the through hole and in which a tip end part of the gutter member is disposed above the oil storage part,
   a parking rod movably disposed in the through hole, the parking rod is configured to be movable in an axial direction of the through hole.

2. The lubrication structure of the power transmission device as claimed in claim 1, wherein a concave-shaped oil flow passage is provided on an upper surface of the gutter member.

3. The lubrication structure of the power transmission device as claimed in claim 2, wherein in the gutter member, from the partition wall side to the tip end part side, a height dimension gradually decreases, and a width dimension gradually decreases whereas a component thickness dimension gradually decreases, so that a width dimension of the concave-shaped oil flow passage gradually increases.

4. The lubrication structure of the power transmission device as claimed in claim 2, wherein in a cross-section of the gutter member, a thickness at a rear in a vehicle front-rear direction is greater than a thickness at a front.

5. The lubrication structure of the power transmission device as claimed in claim 2, wherein the lubrication structure has, on a first chamber side of the through hole, a holder part connected with the partition wall and having an end surface at an upper part of the gutter member.

6. The lubrication structure of the power transmission device as claimed in claim 1, wherein at least an upper surface of the gutter member is inclined downward from a partition wall side toward a tip end part side.

7. The lubrication structure of the power transmission device as claimed in claim 6, wherein oil is stored in a bottom part of the first chamber,
a rotation member is provided in the first chamber,
a portion of the rotation member is immersed into the oil stored in the bottom part of the first chamber, and
through rotation of the rotation member, the oil stored in the bottom part of the first chamber is scooped up to be stored in the oil storage part.

8. The lubrication structure of the power transmission device as claimed in claim 7, wherein a power transmission mechanism is disposed in the first chamber, and
the rotation member is a component of the power transmission mechanism.

9. The lubrication structure of the power transmission device as claimed in claim 8, wherein an electric motor is disposed in the second chamber, and
the power transmission mechanism transmits power input from an internal combustion mechanism outside the power transmission device and outputs the power out of the power transmission device.

10. The lubrication structure of the power transmission device as claimed in claim 9, wherein the parking rod being comprised in a vehicle parking mechanism.

11. The lubrication structure of the power transmission device as claimed in claim 10, wherein a cooling oil passage supplying oil for cooling the electric motor is provided at an upper part of the second chamber, and the oil supplied from the cooling oil passage to the electric motor passes through the through hole.

12. The lubrication structure of the power transmission device as claimed in claim 11, wherein the oil adhering to a surface of the partition wall on a second chamber side and flowing down passes through the through hole.

13. The lubrication structure of the power transmission device as claimed in claim 1, wherein the tip end part of the gutter member is located above the oil storage part and not in contact with the oil storage part.

14. The lubrication structure of the power transmission device as claimed in claim 1, wherein the gutter member is below the through hole on the partition wall and located behind a center of the through hole in a vehicle front-rear direction.

15. The lubrication structure of the power transmission device as claimed in claim 1, wherein oil passing through the through hole from the second chamber and flowing into the first chamber is received by the gutter member and introduced into the oil storage part,
the oil is stored in the oil storage part, and
the oil storage part has a lubrication oil passage on the wall part of the case on which the oil storage part is provided and introduces the oil to a lubricated part in the first chamber via the lubrication oil passage.

16. The lubrication structure of the power transmission device as claimed in claim 1, wherein at least one sidewall of the oil storage part is formed by the wall part of the case, and
a bottom part of the oil storage part is at a position higher than a bottom part of the first chamber and formed by a first rib extending from the wall part of the case, and at least one other sidewall comprises a baffle plate attached to the first rib.

17. The lubrication structure of the power transmission device as claimed in claim 16, wherein the lubrication structure has a second rib above the oil storage part and higher than the gutter member, the second rib extending from the wall part of the case.

18. The lubrication structure of the power transmission device as claimed in claim 17, wherein the baffle plate is attached to the first rib and the second rib.

19. The lubrication structure of the power transmission device as claimed in claim 16, wherein a portion of the baffle plate opposite to the gutter member is bent toward the partition wall.

20. The lubrication structure of the power transmission device as claimed in claim 1, wherein the through hole is in a shape with a diameter decreasing from the second chamber toward the first chamber.

* * * * *